United States Patent
Veluswamy et al.

(10) Patent No.: US 9,454,416 B2
(45) Date of Patent: Sep. 27, 2016

(54) DETECTING HIGH AVAILABILITY READINESS OF A DISTRIBUTED COMPUTING SYSTEM

(71) Applicant: NetApp, Inc., Sunnyvale, CA (US)

(72) Inventors: Senthil Kumar Veluswamy, Tamil Nadu (IN); Sathiya Kumaran Mani, Madison, WI (US); Shubham Tagra, Solan (IN)

(73) Assignee: NetApp, Inc., Sunnyvale, CA (US)

(*) Notice: Subject to any disclaimer, the term of this patent is extended or adjusted under 35 U.S.C. 154(b) by 200 days.

(21) Appl. No.: 14/513,881

(22) Filed: Oct. 14, 2014

(65) Prior Publication Data
US 2016/0103720 A1    Apr. 14, 2016

(51) Int. Cl.
G06F 11/07    (2006.01)
G06F 11/00    (2006.01)
G06F 11/20    (2006.01)

(52) U.S. Cl.
CPC ......... G06F 11/008 (2013.01); G06F 11/2023 (2013.01); G06F 2201/805 (2013.01)

(58) Field of Classification Search
CPC .......... G06F 11/2023; G06F 11/2028; G06F 11/2069; G06F 11/2092
USPC ................................. 714/4.11, 6.3
See application file for complete search history.

(56) References Cited

U.S. PATENT DOCUMENTS

| | | | | |
|---|---|---|---|---|
| 6,763,479 B1* | 7/2004 | Hebert | ........... | G06F 11/2005 714/4.11 |
| 8,018,860 B1* | 9/2011 | Cook | ........... | H04L 41/145 370/218 |
| 2004/0123180 A1* | 6/2004 | Soejima | ........... | G06F 11/1096 714/5.1 |
| 2007/0180314 A1* | 8/2007 | Kawashima | ........ | G06F 11/2023 714/15 |
| 2008/0263390 A1* | 10/2008 | Baba | ........... | G06F 11/1484 714/4.1 |
| 2011/0228668 A1* | 9/2011 | Pillai | ........... | G06F 11/2023 370/217 |
| 2012/0260121 A1* | 10/2012 | Yadav | ........... | H04L 45/28 714/2 |
| 2014/0095925 A1* | 4/2014 | Wilson | ........... | G06F 11/1425 714/4.12 |
| 2014/0317441 A1* | 10/2014 | Arata | ........... | G06F 11/2033 714/4.12 |
| 2015/0006949 A1* | 1/2015 | Bittles | ........... | G06F 8/65 714/4.11 |
| 2015/0205650 A1* | 7/2015 | Shimada | ........... | G06F 11/004 714/703 |
| 2015/0242134 A1* | 8/2015 | Takada | ........... | G06F 3/061 711/114 |

* cited by examiner

Primary Examiner — Chae Ko
(74) Attorney, Agent, or Firm — LeClairRyan, a Professional Corporation

(57) ABSTRACT

Technology is disclosed for determining high availability readiness of a distributed computing system ("system"). A confidence measure (CM) can be computed for a particular controller in the system to determine whether a takeover by the particular controller from a first controller would be successful. The CM can be a percentage value. A CM of 0% indicates that a takeover would be a failure, which results in loss of access to data managed by the first controller. A CM of 100% indicates a successful takeover with no performance impact on the system. A CM between 0% and 100% indicates a successful takeover but with a performance impact. The CM can be computed based on events occurring in the system, e.g., veto and non-veto events. The CM is computed as a function of various weights and/or indices associated with the veto events and/or non-veto events.

20 Claims, 8 Drawing Sheets

| Event No. | Event Name | Event Type | Severity Index |
|---|---|---|---|
| 1 | Battery low warning | Veto Event | N/A |
| 2 | Inter-Connect Down | Veto Event | N/A |
| 3 | High CPU utilization | Non-Veto Event | 5 |
| 4 | Multiple fan failure | Non-Veto Event | 1 |
| 5 | CRC errors on FC loop | Non-Veto Event | 2 |
| 6 | Multiple disk failures leading to RAID reconstruction | Non-Veto Event | 10 |
| 7 | Chassis Over/Under Temperature Event | Non-Veto Event | 8 |
| 8 | Fibre Channel Protocol (FCP) Target Loop Initialisation Primitive (LIP) Reset due to unknown World Wide Port Name (WWPN) | Non-Veto Event | 7 |

*FIG. 2*

|  | EVENT 3 | EVENT 5 | EVENT 8 |
|---|---|---|---|
| $S_i$ | 5 | 2 | 7 |
| CF (calculated in Real time) | 75% | 80% | 95% |
| $W_i = \dfrac{SI_i}{\sum_{i=1}^{n} SI_i}$ | $\dfrac{5}{14} = 0.36$ | $\dfrac{2}{14} = 0.14$ | $\dfrac{7}{14} = 0.5$ |
| $P_i = W_i * CF_i$ | $0.36 * 75\% = 0.27$ | $0.14 * 80\% = 0.112$ | $0.50 * 95\% = 0.475$ |
| $V_i$ | N/A | N/A | N/A |

Veto = 1 (No veto event occurred)

$$CM = \left(\sum_{i=1}^{n} P_i\right) * Veto * 100\% = (0.27 + 0.112 + 0.475) * 1 * 100\% = 85.7\%$$

*FIG. 3A*

|  | EVENT 1 | EVENT 5 | EVENT 6 | EVENT 7 |
|---|---|---|---|---|
| Si | N/A | 2 | 10 | 8 |
| CF (calculated in Real time) | N/A | 80% | 75% | 80% |
| $Wi = \dfrac{SI_i}{\sum_{i=1}^{n} SI_i}$ | N/A | $\dfrac{2}{20} = 0.1$ | $\dfrac{10}{20} = 0.5$ | $\dfrac{8}{20} = 0.4$ |
| $Pi = Wi * CFi$ | N/A | $0.1 * 80\% = 0.08$ | $0.5 * 75\% = 0.375$ | $0.4 * 80\% = 0.32$ |
| Vi | 0 | N/A | N/A | N/A |

$Veto = 1 * V1 = 1 * 0 = 0$ (Veto event 1 occurred)

$$CM = \left(\sum_{i=1}^{n} Pi\right) * Veto * 100\% = (0.08 + 0.375 + 0.32) * 0 * 100\% = 0\%$$

*FIG. 3B*

DETECTING HIGH AVAILABILITY READINESS OF A DISTRIBUTED COMPUTING SYSTEM

TECHNICAL FIELD

Several of the disclosed embodiments relate to distributed computing systems, and more particularly, to determining high availability (HA) readiness of a distributed computing system.

BACKGROUND

Any disaster, e.g., a power outage or a high magnitude earth quake can affect a datacenter, which can result in loss of data stored at the datacenter. Disaster recovery solutions are used to provide data protection in case of the disasters. These disaster recovery solutions are expected to withstand the data outages if they are within the agreed limits. In order to provide protection against disasters, some disaster recovery solutions employ redundant machines, e.g., servers, to provide access to the data, or store multiple copies of data. In some cases, different copies of data are stored at different datacenters, which can be located in different geographical regions. If a datacenter in one geographical region is affected by a disaster, data can be served from a copy stored at another datacenter in another geographical region.

However, many of the disaster recovery solutions lack abilities to determine, before the disaster occurs, if the implemented disaster recovery solution is capable of handling the disaster. Typically, when a disaster occurs in a first region having a first server managing the data, the disaster recovery solution fails over to a second server in a second region to continue to provide access to the data. Many disaster recovery solutions do not provide a provision to proactively measure success of a TakeOver (TO) by a second server in case of a disaster, or a potential GiveBack (GB) by the second server after the first server recovers from the disaster. Also, there is no provision to determine the magnitude of performance impact on the second server in post disaster scenarios.

BRIEF DESCRIPTION OF THE DRAWINGS

FIG. 2 is a block diagram illustrating a table of example events that can occur in the distributed computing system of FIG. 1, consistent with various embodiments.

FIG. 3A is a block diagram illustrating an example for computing a confidence measure of a first controller of FIG. 1 as a function of the weights and indices of various non-veto events and veto events that occur in the distributed computing system of FIG. 1, consistent with various embodiments.

FIG. 3B is a block diagram illustrating an example for computing a confidence measure of a second controller of FIG. 1 as a function of the weights and indices of various non-veto events and veto events that occur in the distributed computing system of FIG. 1, consistent with various embodiments.

DETAILED DESCRIPTION

Figure 1:
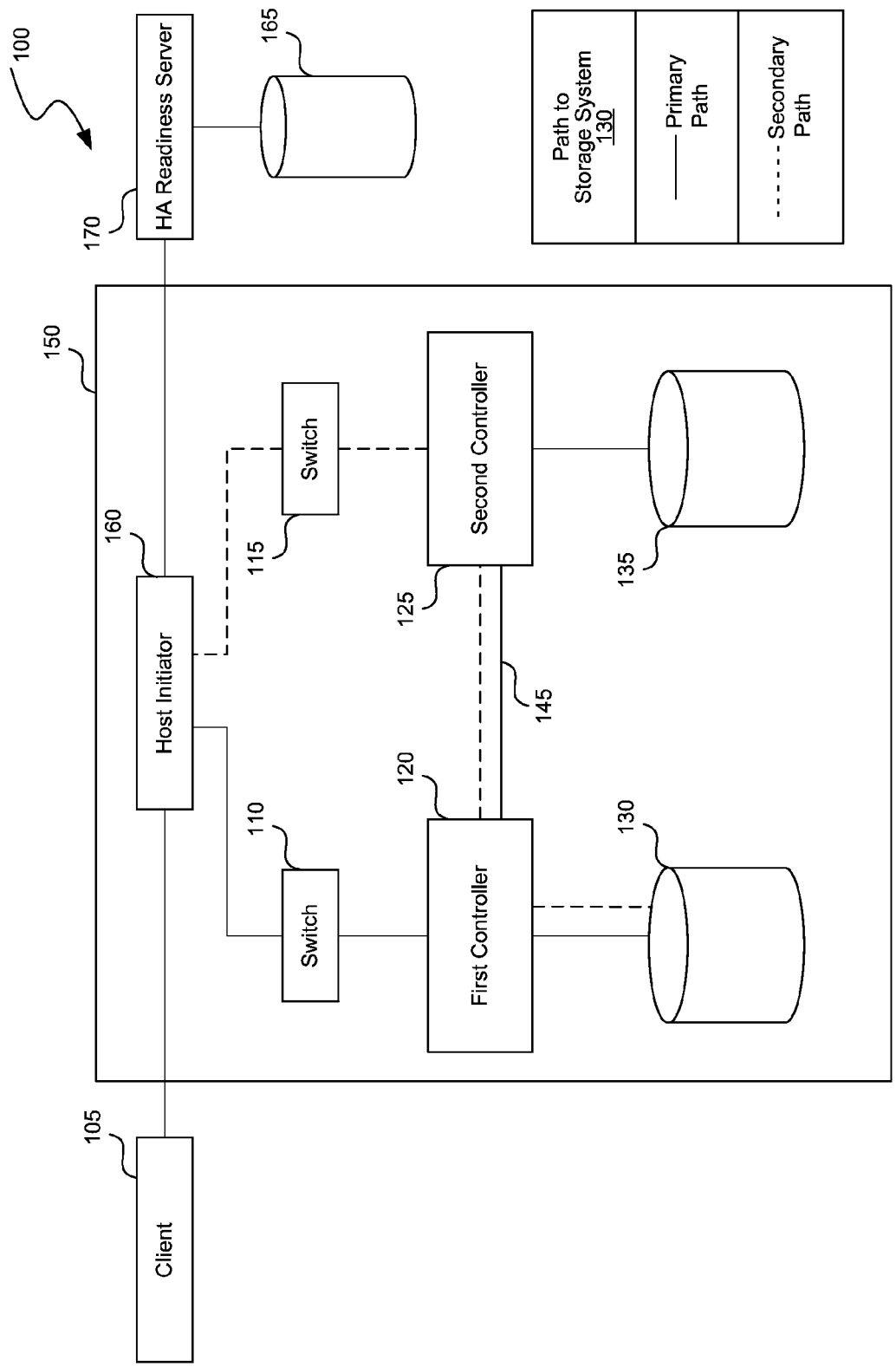
FIG. 1 is a block diagram illustrating an environment in which disclosed embodiments for measuring HA readiness of controllers in a distributed computing system can be implemented.

Technology is disclosed for determining high availability (HA) readiness of a distributed computing system. A distributed computing system includes two or more server computing devices (also referred to as "nodes" and/or "controllers") that are configured to provide high availability to the data stored in the distributed computing system to any client computing device ("client") that requests the data. In some embodiments, each of the controllers is responsible for managing data access requests received for data stored at their corresponding storage system. For example, in a distributed computing system having two controllers with their associated storage system, a first controller is responsible for managing data access requests received for data stored at a first storage system associated with first controller and a second controller is responsible for managing data access requests received for data stored at a second storage system associated with second controller.

If the first controller fails, the second controller can take over the first controller and manage data access requests for data stored in the first storage system. The second controller is configured as a stand-by controller or a partner controller for the first controller, which can take over from the first controller if the first controller becomes unavailable. After the takeover, if the first controller becomes available, the second controller can give back the control of the first storage system to the first controller. Similarly, the first controller is configured as a stand-by controller or a partner controller for the second controller, which can take over from the second controller if the second controller becomes unavailable.

In some embodiments, the distributed computing system is said to be HA if a failure of one controller does not result in a loss of access to the data stored at the storage system associated with the failed controller, and access to the data can be provided by failing over to another controller in the distributed computing system.

A confidence measure can be computed for a particular controller to determine whether a failover from a first controller to the particular controller would be successful, e.g., when the first controller fails or otherwise becomes unavailable. The confidence measure can also be used to determine if the takeover by the particular controller would result in a sub-optimal performance of the distributed computing system. In some embodiments, the confidence measure is computed as a value that ranges between a first threshold and a second threshold, e.g., "0%" to "100%". If the confidence measure of the particular controller is at the first threshold, e.g., 0%, then failing over to the particular controller from the first controller can result in a failure of the takeover by the particular controller. That is, the particular controller is not capable of taking over from the first controller and the access to data managed by the first controller is lost. On the other hand, if the confidence measure of the particular controller is at the second threshold, e.g., 100%, then the takeover by the particular controller from the first controller is successful and there will be no impact on the performance of the distributed computing system.

If the confidence measure is between 0% and 100%, then the takeover by the particular controller is successful but there can be an impact on the performance of the distributed computing system, e.g., the clients can experience a delay in receiving responses to their data access requests, certain resources of the distributed computing system may be unavailable momentarily, etc. For example, if the confidence measure is 60%, then there can be a performance impact of 40% on the distributed computing system after the takeover by the particular controller. The higher the confidence measure, the lower is the impact on the performance of the distributed computing system after the takeover by the particular controller. The confidence measure can help the administrators in determining the HA readiness of the distributed computing system, e.g., so that the distributed computing system can be better configured to handle disaster recovery situations. The confidence measure of a particular controller can be available at all times so that the administrators can monitor the HA readiness of the particular controller and take necessary actions to increase the confidence measure, thereby increasing the chances of a successful disaster recovery.

The confidence measure can be computed based on a number of events occurring in the distributed computing system related to a particular controller. The events are classified into veto events and non-veto events, and the events are associated with various weights and/or indices. The confidence measure is computed as a function of the various weights and/or indices of the veto events and/or non-veto events related to the particular controller.

In some embodiments, veto events are the events that have a direct impact on a success or failure of HA of the distributed computing system. A veto event can be an event the occurrence of which can cause the fail over to the particular controller fail, and therefore cause the access to the storage system associated with the failed controller to be lost. For example, a failure of an interconnect which connects the particular controller to the HA pair can be a veto event since the particular controller cannot access the storage system of the failed controller.

In some embodiments, non-veto events are the events that can have a performance impact on the distributed computing system after the takeover by the particular controller, but are events that do not cause the takeover to fail.

Environment

FIG. 1 is a block diagram illustrating an environment 100 in which disclosed embodiments for measuring HA readiness of controllers in a distributed computing system can be implemented. The environment 100 includes a pair of controllers, a first controller 120 and a second controller 125 implemented as a HA pair in the distributed computing system 150 to provide high availability to data stored in a first storage system 130 and a second storage system 135. The first storage system 130 is associated with the first controller 120 and the second storage system 135 is associated with second controller 125. In some embodiments, each of the controllers is responsible for managing data access requests received from a client computer ("client") 105 for data stored at their corresponding storage systems. For example, in the distributed computing system 150 the first controller 120 is responsible for managing data access requests received for data stored at the first storage system 130 and the second controller 125 is responsible for managing data access requests received for data stored at the second storage system 135.

The second controller 125 is configured as a stand-by controller or a partner controller for the first controller 120. That is, if the first controller 120 becomes unavailable to process the data request, e.g., due to a failure, the second controller 125 can take over the first storage system 130 from the first controller 120 and manage the data access requests for data stored in the first storage system 130. If the first controller 120 becomes available subsequently, the second controller 125 can give back the control of the first storage system 130 to the first controller 120. The data in the first storage system 130 is accessed over a primary path when the first controller 120 is available and over a secondary path when the first controller 120 is not available.

Similarly, the first controller 120 can be configured as a stand-by controller or a partner controller for the second controller 125. That is, if the second controller 125 fails, the first controller 120 can take over the second storage system 135 from the second controller 125 and manage the data access requests for data stored in the second storage system 135.

In some embodiments, the distributed computing system 150 is said to be HA if a failure of one controller does not result in a loss of access to the data stored at the storage system associated with the failed controller, and access to the data can be provided by failing over to another controller in the distributed computing system.

The distributed computing system 150 includes a host initiator device 160 ("host initiator") that facilitates a failover from one controller to another controller in the HA pair, e.g., in case of a disaster. For example, the host initiator 160 initiates a failover from the first controller 120 to the second controller 125 if the first controller 120 becomes unavailable. In some embodiments, the distributed computing system 150 can include multiple datacenters that are spread across various geographical regions, e.g., the first controller 120 can be in a first geographical region and the second controller 125 can be in a second geographical region. When the first controller 120 becomes unavailable due to a disaster in the first geographical region, e.g., power outage or an earthquake, the host initiator 160 fails over to the second controller 125. In other words, the host initiator 160 initiates the second controller 125 to take over from the first controller 120. After the second controller 125 takes over from the first controller 120, the second controller 125 can serve the data access requests from the client 105. The first controller 120 is connected to the host initiator 160 via a first network switch 110 and the second controller 125 is connected to the host initiator 160 via a second network switch 115.

In some embodiments, the distributed computing system 150 can be implemented as a storage area network (SAN) using servers commercialized by NetApp of Sunnyvale, Calif., that uses various storage operating systems, including the NetApp® Data ONTAP™. The first storage system 130 and the second storage system 135 can be implemented as logical unit number (LUNs). A LUN refers to an entire physical disk, or a subset of a larger physical disk or a disk volume. The physical disk or disk volume can be an entire single disk drive, a partition (subset) of the single disk drive, or disk volume from a RAID controller comprising multiple disk drives aggregated together for larger capacity and redundancy. LUNs represent a logical abstraction or a virtualization layer between the physical disk device/volume and the applications. The LUN can be mounted onto the controller as a volume, which can then be used for reading data from and/or writing data to.

Though FIG. 1 illustrates providing HA to the data stored in the distributed computing system 150 using a pair of controllers, the number of controllers providing HA need not be restricted to two controllers. The distributed computing system 150 can provide HA using multiple controllers, e.g., multiple controllers can act as a partner controller for a storage system of a specified controller.

In some embodiments, the environment 100 includes a HA readiness server computer 170 ("HA readiness server") that computes a confidence measure for one or more of the controllers. The confidence measure of a particular controller, e.g., the second controller 125, indicates a HA readiness of the distributed computing system 150. The higher the confidence measure of the particular controller, the higher the likelihood of a successful takeover by the particular controller and the lower the performance impact on the distributed computing system 150 after the takeover. In some embodiments, the host initiator 160 can select a particular controller to take over from the failing controller based on the confidence measure of the controllers.

In some embodiments, the HA readiness server 170 can report the confidence measure of the controllers to a user, e.g., an administrator of the distributed computing system 150. If the confidence measure of one or more of the controllers is below a specified threshold, the HA readiness server 170 can send an alert/notification to the administrator. The administrator can perform the necessary tasks to improve the confidence measure of the one or more controllers, thereby increasing the chances of a successful disaster recovery. In some embodiments, the notification can also include a recommendation of tasks to be performed to improve the confidence measure of a particular controller.

In some embodiments, the HA readiness server 170 determines the confidence measure of a particular controller as a function of a number of events related to the particular controller that have occurred in the distributed computing system 150. The events are classified into veto events and non-veto events. In some embodiments, veto events are the events that have a direct impact on a success or failure of HA of the distributed computing system. A veto event can be an event the occurrence of which can cause the fail over to the particular controller fail, and therefore cause the access to data stored at the storage system associated with the failed controller to be lost. For example, a failure of an interconnect 145 which connects the particular controller to the HA pair can be a veto event. In another example, a battery low warning in the particular controller can be a veto event.

In some embodiments, non-veto events are the events that can have a performance impact on the distributed computing system 150 after the takeover by the particular controller, but are events that do not cause the takeover to fail. Examples of performance impact can include delays in responding to the data access requests from the client 105, inefficient utilization of computing resources such as memory, CPU time of the controller, and network bandwidth. Examples of non-veto event can include multiple fan failures, high CPU utilization, and multiple disk failures leading to RAID reconstruction. Different non-veto events can be of different severity levels and can have different performance impact on the working of the distributed computing system.

FIG. 2 shows a table of example events that can occur in the distributed computing system of FIG. 1, consistent with various embodiments. The table 200 includes examples of both veto events and non-veto events. In some embodiments, each of the non-veto events are associated with a severity index as shown in the table 200. The severity index indicates an extent of performance impact on the distributed computing system 150 after the particular controller takes over from a failed controller. The severity index can be defined on various types of scales. For example, the severity index can be defined on a scale of "1" to "10" with "1" being least severe, that is, the event has the least impact on the performance on the distributed computing system 150 after the particular controller takes over and "10" being most severe, that is, the event has maximum impact on the performance on the distributed computing system 150 after the particular controller takes over.

In some embodiments, each of the non-veto events are also associated with a compliance factor (CF). The CF can be calculated as different types of values. For example, the CF is calculated as a percentage value. The percentage value denotes the compliance of the event with the expected behavior. The lesser the percentage value the lesser the event is compliant with the expected behavior. In other words, a lesser percentage value means that the event has deviated more. In some embodiments, the HA readiness server 170 measures the CF of an event in real time, that is, as and when the event occurs in the distributed computing system 150.

In some embodiments, the classification of an event to a veto event or a non-veto event, and the assignment of a severity index to the event can be defined by a user, e.g., an administrator of the distributed computing system 150. For example, the administrator can define an event classification policy which includes criteria for classifying the events and assigning a particular severity index to a particular event. The administrator can further define what is the expected behavior of the event, the criteria for determining the CF of the event based on the expected behavior and the actual behavior in the event classification policy. The event classification policy can be stored at a third storage system 165 associated with the HA readiness server 170. The HA readiness server 170 can use the event classification policy to classify any events that may occur in the distributed computing system 150 into a veto event and a non-event, to assign the severity index, and to determine the CF. In some embodiments, the distributed computing system 150 generates a log (not illustrated), which includes, among other things, information regarding the events that occurred in the distributed computing system 150 over a specified period. The HA readiness server 170 can obtain information regarding the events that occurred in the distributed computing system 150 from the log.

The confidence measure is computed as a percentage value. If the confidence measure of the particular controller is at a first threshold, e.g., 0%, then failing over to the particular controller from the first controller can result in a failure of the takeover by the particular controller, which causes the access to the data in the storage system associated with the failed controller to be lost. On the other hand, if the confidence measure of the particular controller is at a second threshold, e.g., 100%, then the takeover by the particular controller is successful and there will be no impact on the performance of the distributed computing system 150.

If the confidence measure is between 0% and 100%, then the takeover by the particular controller is successful but there can be an impact on the performance of the distributed computing system 150, e.g., the client 105 can experience a delay in receiving responses to the data access request, some resources of the distributed computing system 150 may be unavailable momentarily, etc. For example, if the confidence measure of the particular controller is 60%, then it indicates that there can be a performance impact of 40% on the distributed computing system 150 after the takeover by the particular controller.

The HA readiness server 170 computes the confidence measure as a function of the various weights and/or indices of the veto events and/or non-veto events related to the particular controller. In some embodiments, the confidence measure is determined as a function of the severity index of the non-veto events, CF of the non-veto events and an absence or presence of veto events. For example, the confidence measure of the particular controller can be computed using the formula:

$$CM = \left(\sum_{i=1}^{n} Pi\right) * Veto * 100\%$$

where, $P_i$ is a primitive value of the event i (additional details of which are discussed below), n is the number of events related to the first controller 120, and Veto indicates a presence ("0") or absence ("1") of a veto event.

FIGS. 3A and 3B illustrate computation of a confidence measure as a function of the weights and indices of various non-veto events and veto events that occur in the distributed computing system of FIG. 1, consistent with various embodiments. Consider that events "Event 3," "Event 5" and "Event 8" of FIG. 2 occurred in the first controller 120 of FIG. 1 and events "Event 1," "Event 5," "Event 6" and "Event 7" occurred in the second controller 125. FIG. 3A shows a table 300 that illustrates computation of the weights and indices of various non-veto events related to the first controller 120. The HA readiness server 170 computes a weight of each of the non-veto events as a function of the severity index of the corresponding event and the severity indices of all the non-veto events. For example, the weight of the non-veto event can be computed using the formula:

$$Wi = \frac{SI_i}{\sum_{i=1}^{n} SI_i}$$

where, $W_i$ is the weight of the event i, $SI_i$ is a severity index of the event i and n is the number of events related to the first controller 120.

After computing the weight, the HA readiness server 170 computes the primitive value for each of the events as a function of the weight of the corresponding event and the CF of the corresponding event. For example, the primitive value of the non-veto event can be computed using the formula:

$$Pi = Wi * CFi$$

where, $W_i$ is the weight of the event i, and $CF_i$ is the compliance factor of the event i.

In the first controller 120, there are no veto events and therefore, the value of Veto is "1." The confidence measure of the first controller is then computed using the formula CM=$(\Sigma_{i=1}^{n} Pi)*Veto*100\%$, which evaluates to 85.7%. A confidence measure of 85.7% means that the first controller can successfully take over from the second controller 125 and manage data requests associated with the second storage system 135 of the second controller 125. However, if the first controller 120 takes over from the second controller 125, there would be a performance impact of 14.3% on the working of the distributed computing system.

The confidence measure of the second controller 125 can also be determined similarly, as described with reference to FIG. 3B. As indicated in the table 350, a veto event, "Event 1" has occurred with respect to the second controller 125, which causes the value of Veto to be "0" and therefore, resulting in a 0% confidence measure. The confidence measure of 0% means that the second controller 125 is not capable of taking over from the first controller 120. In other words, if the second controller 125 takes over from the first controller 120, the takeover can fail and access to the first storage system 130 of the first controller 120 can be lost.

The confidence measure can help the administrators in determining the HA readiness of the distributed computing system 150, e.g., so that the distributed computing system 150 can be better configured to handle disaster recovery situations. The confidence measure of a particular controller can be available at all times so that the administrators can monitor the HA readiness of the particular controller and take necessary actions to increase the confidence measure, thereby increasing the chances of a successful disaster recovery. As described above, if the confidence measure of one or more of the controllers is below a specified threshold, the HA readiness server 170 can send an alert/notification to the administrator. The administrator can perform the necessary tasks to improve the confidence measure. In some embodiments, the notification can also include a recommendation of the tasks to be performed to improve the confidence measure of a particular controller.

Figure 4:
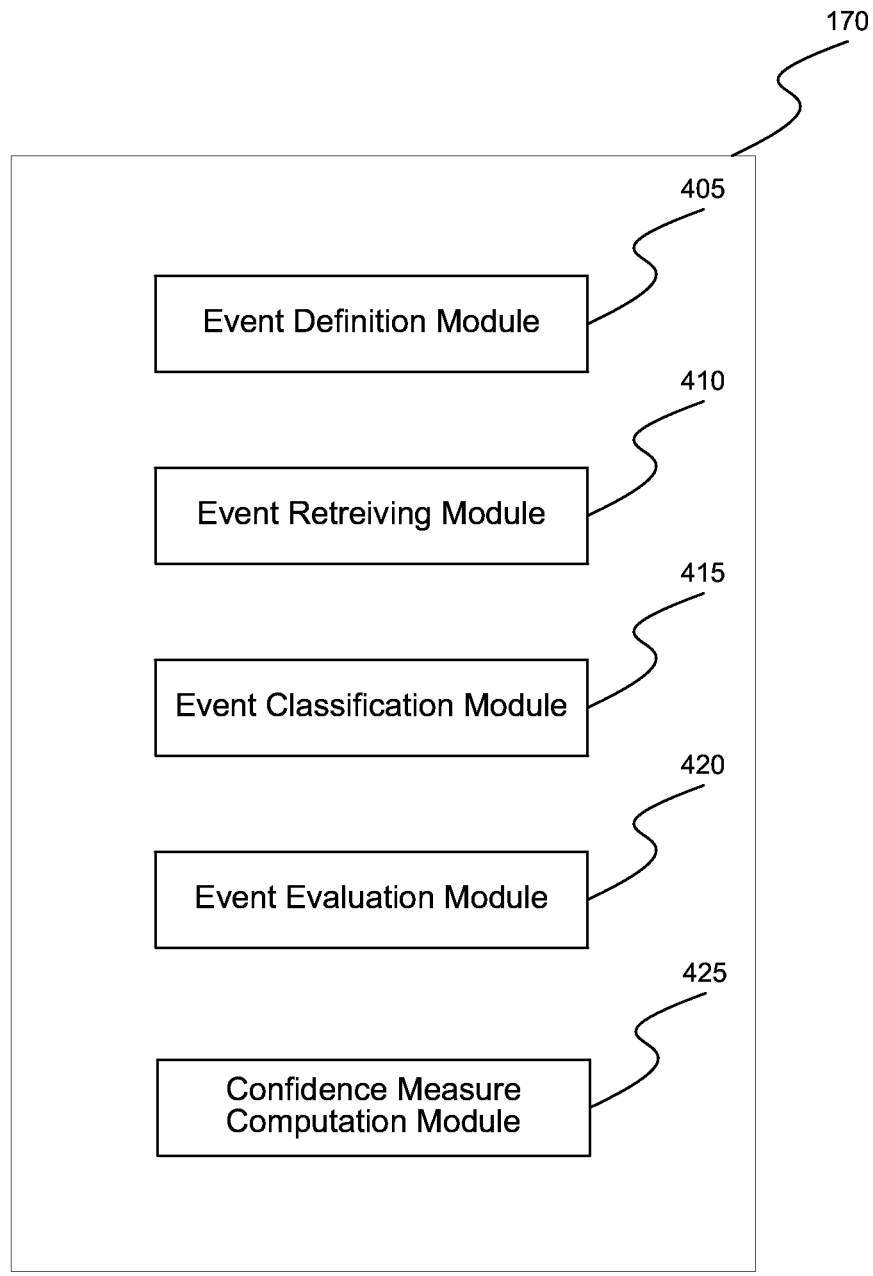
FIG. 4 is a block diagram of the HA readiness server of FIG. 1, consistent with various embodiments.

FIG. 4 is a block diagram of the HA readiness server of FIG. 1, consistent with various embodiments. The HA readiness server 170 includes an event definition module 405 that enables a user, e.g., an administrator of the distributed computing system 150, to define the criteria for classifying the events that occur in the distributed computing system 150 to veto events and non-veto events in the event classification policy. In some embodiments, the event definition module 405 can provide a graphical user interface (GUI) using which the user can define the criteria for classifying the events. The user can define the criteria for assigning the severity indices to the non-veto events, and define the expected behavior of the non-veto events using the GUI.

The event retrieving module 410 identifies the events that have occurred in the distributed computing system 150. In some embodiments, the distributed computing system 150 records the events occurring in the distributed computing system 150 in a log. The event retrieving module 410 can analyze the log to identify the events. The event retrieving module 410 also identifies the controllers to which the events are related.

The event classification module 415 classifies the identified events into veto events and non-veto events and assigns the severity indices non-veto events based on the event classification policy.

The event evaluation module 420 computes various values of non-veto events, such as a CF of the event, a weight of the event and a primitive value of the event using the various values assigned by with the event classification module 415. In some embodiments, the event evaluation module 420 monitors the events occurring in the distributed computing system 150 and calculates the CF of event in real-time.

The confidence measure computation module 425 computes the confidence measure of a controller as a function of the various values associated with the veto events and the non-veto events, e.g., the primitive value of a non-veto event determined by the event evaluation module 420 and a value indicating an absence or presence of a veto event, as described at least with reference to FIGS. 3A and 3B.

Though the HA readiness server 170 is illustrated as a stand-alone server in the environment 100 of FIG. 1, it should be noted that the HA readiness server 170 can be implemented as a distributed system using multiple computing devices where the modules 405-425 are spread across the distributed system.

Figure 5:
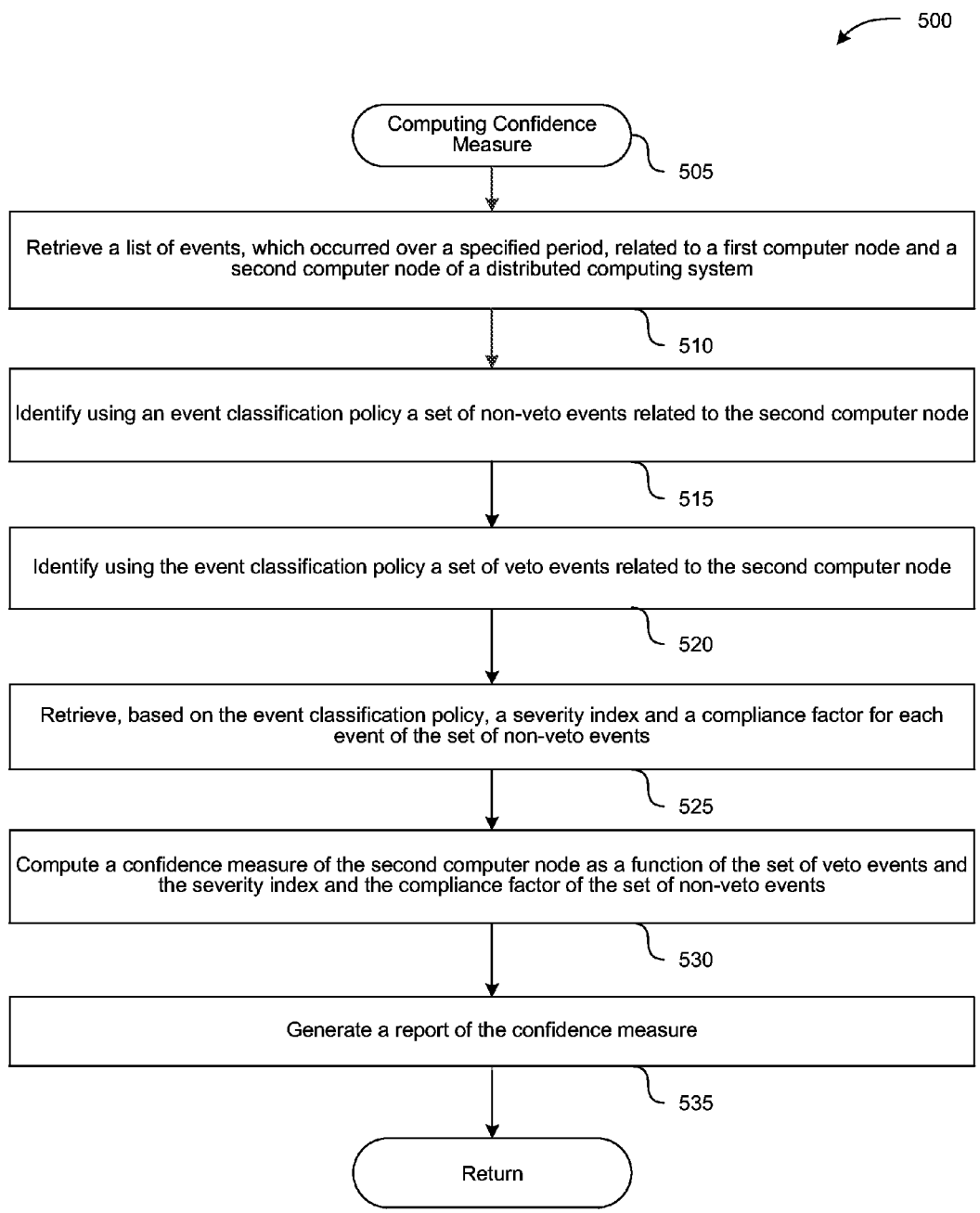
FIG. 5 is a flow diagram a process of computing a confidence measure of a controller of the distributed computing system of FIG. 1, consistent with various embodiments.

FIG. 5 is a flow diagram a process 500 of computing a confidence measure of a controller of the distributed computing system of FIG. 1, consistent with various embodiments. In some embodiments, the process 500 may be implemented in environment 100 of FIG. 1. The process 500 begins at block 505, and at block 510, the event retrieving module 410 of the HA readiness server 170 retrieves a list of events related to a controller for which the confidence measure has to be computed, e.g., the second controller 125. The events could have occurred over a specified period in the distributed computing system. In some embodiments, the events occurring in the distributed computing system are recorded in a log. The event retrieving module 410 can analyze the log to identify the events related to the controller.

At block 515, the event classification module 415 identifies the set of non-veto events related to the second controller 125 based on the event classification policy. In some embodiments, if non-veto events have not occurred, then the set of non-veto events can be a null set.

At block 520, the event classification module 415 identifies a set of veto events related to the second controller 125 based on the event classification policy. In some embodiments, if no veto events have occurred, then the set of veto events can be a null set.

At block 525, the event classification module 415 retrieves the severity indices of each of the set of non-veto events. Further, the event classification module 415 also retrieves the CF of each of the events computed by the event evaluation module 420.

At block 530, the confidence measure computation module 425 computes the confidence measure of the second controller 125 as a function of the severity indices and CF of the set of non-veto events and values associated with the set of veto events, and the process 500 returns. In some embodiments, the process 500 can be used to compute the confidence measure of other such controllers in the distributed computing system, e.g., first controller 120. For example, the process 500 can be used to compute the confidence measure of the first controller 120 to determine whether the first controller 120 would be capable of managing the data access requests when the first controller 120 recover from the disaster and becomes available again. If the confidence measure of the first controller 120 is above a specified threshold, the second controller 125 can give back the control to the first controller 120.

At block 535, the confidence measure computation module 425 generates a report containing the confidence measure of one or more controllers of the distributed computing system. The report can be sent to the administrator of the distributed computing system. In some embodiments, if a confidence measure of a specified controller is below a specified threshold, an alert/notification regarding the low confidence measure can be sent to the administrator, e.g., via email, a text message, an alert in a particular application executing on the HA readiness server. The report can also have suggested tasks to be performed to improve the confidence measure.

Figure 6:
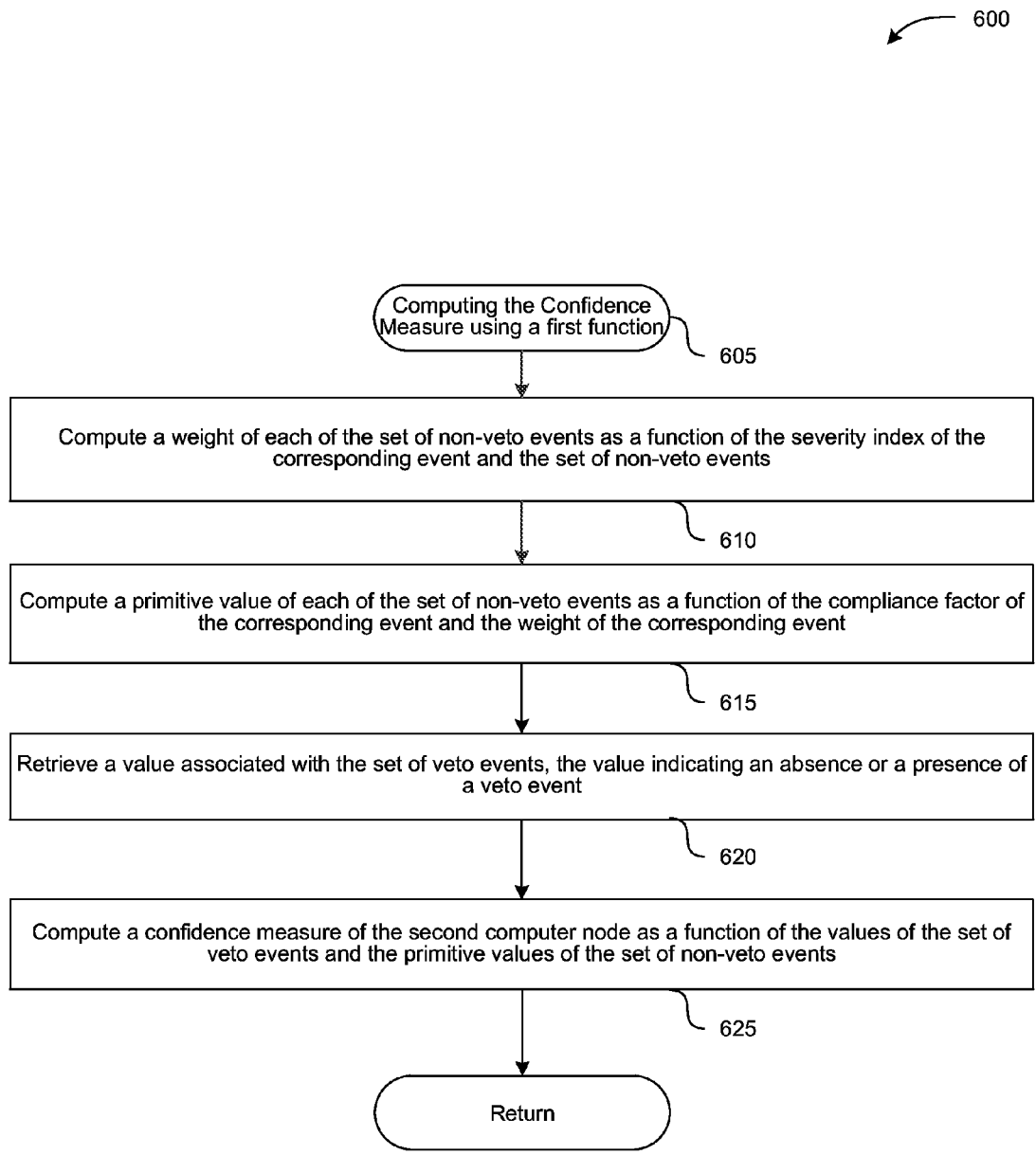
FIG. 6 is a flow diagram of a process for computing the confidence measure of process of FIG. 5 using a specified function, consistent with various embodiments.

FIG. 6 is a flow diagram of a process 600 for computing the confidence measure of process 500 using a specified function, consistent with various embodiments. In some embodiments, the process 600 may be implemented in environment 100 of FIG. 1. In some embodiments, the process 600 is used to determine the confidence measure computed at block 530 of process 500 using a specified function.

The process 600 begins at block 605, and at block 610, the event evaluation module 420 computes a weight of each of the set of non-veto events as a function of the severity index of the corresponding event and the severity indices of all of the set of non-veto events. For example, the weight of the non-veto event can be computed using the formula:

$$Wi = \frac{SI_i}{\sum_{i=1}^{n} SI_i}$$

where, $W_i$ is the weight of the event i, $SI_i$ is a severity index of the event i and n is the number of events related to the first controller 120.

At block 615, the event evaluation module 420 computes the primitive value for each of the events of the set of non-veto events as a function of the weight of the corresponding event and the CF of the corresponding event. For example, the primitive value of the non-veto event can be computed using the formula:

$$Pi = Wi * CFi$$

where, $W_i$ is the weight of the event i, and $CF_i$ is the compliance factor of the event i.

At block 620, the event evaluation module 420 determines a value, "Veto" associated with the veto events. The value associated with a veto event indicates a presence or an absence of veto events. In some embodiments, if there is at least one veto event, then the value of Veto is determined as "0" or "FALSE." If there are no veto events, e.g., the set of veto events is a null set, then the value of Veto is determined as "1" or "TRUE."

At block 625, the confidence measure computation module 425 computes the confidence measure of the second controller 125 as a function of the values associated with veto events and primitive values associated with the set of non-veto events. For example, the confidence measure CM, is computed using the formula:

$$CM = (\Sigma_{i=1}^{n} Pi) * \text{Veto} * 100\%.$$

Some embodiments include a computer-implemented method for receiving a list of multiple events that have occurred in a distributed computing system over a specified period, the events related to a first computer node and a second computer node of the distributed computing system, the first computer node configured to manage a data access request received from a client computer node for data stored at a storage system associated with the first computer node, the second computer node configured to take over from the first computer node in case the first computer node becomes unavailable; determining, based on an event classification policy, a set of non-veto events and a set of veto events related to the second computer node from the events; retrieving, based on the event classification policy, a severity index and a compliance factor for each event of the set of non-veto events; and computing a confidence measure of the second computer node as a function of the set of veto events and the severity index and the compliance factor of the set of non-veto events.

The confidence measure can indicate at least one of whether the takeover by the second computer node fails, which results in a loss of access to the storage system or a magnitude of an impact on a performance of the distributed computing system if the second computer node takes over from the first computer node.

The severity index of an event of the set of non-veto events can indicate a magnitude of performance impact on the distributed computing system due to the occurrence of the event.

The severity index of the event can be recorded in real-time as the event occurs.

The compliance factor an event of the set of non-veto events can indicate a deviation of the event from an expected behavior of the event.

The set of non-veto events can be events that have an adverse impact on computing resources of the distributed computing system if the second computer node takes over from the first computer node. The set of non-veto events exclude events that cause the takeover to fail.

In some embodiments, computing the confidence measure of the second computer node includes computing a value of the confidence measure that ranges between a first threshold and a second threshold.

The confidence measure having the value equal to the first threshold can indicate that the takeover by the second computer node fails.

The confidence measure having the value equal to the second threshold can indicate that there is no adverse impact on computing resources of the distributed computing system if the second computer node takes over from the first computer node.

In some embodiments, the method further includes determining that the value of the confidence measure is below a specified threshold, which is between the first threshold and the second threshold, generating a notification indicating the value of the confidence measure, and transmitting the notification to a user associated with the distributed computing system.

In some embodiments, generating the notification includes generating a list of tasks to be performed to increase the confidence measure above the specified threshold.

In some embodiments, computing the confidence measure of the second computer node includes determining that the set of veto events is not a null set, which indicates that a veto event related to the second computer node occurred in the distributed computing system, and computing the value of the confidence measure as equal to the first threshold if the set of veto events is not a null set. The veto event can be an event that causes the takeover by the second computer node to fail and result in loss of access to data stored at the storage system.

The event classification policy can be defined by an administrator of the distributed computing system.

The second computer node can be configured to, after taking over from the first computer node, respond to the data access request by accessing the storage system associated with the first computer node.

The first computer node can provide the client computer node access to the storage system over a primary path, and the second computer node can provide the client computer node access to the storage system over a secondary path, which is different from the primary path.

Some embodiments include a computer-readable storage medium storing computer-executable instructions, which includes: instructions for identifying, in a distributed computing system having a first computer node and a second computer node, among multiple events that have occurred over a specified period, a set of non-veto events and a set of veto events related to the second computer node. In some embodiments, the first computer node is configured to manage a data access request received from a client computer node for accessing data stored at a storage system associated with the first computer node, and the second computer node is configured to take over from the first computer node to respond to the data access request in case the first computer node becomes unavailable.

The computer-readable storage medium can further include instructions for computing, based on an event classification policy, a weight of each of the set of non-veto events as a function of a severity index of the corresponding event and the set of non-veto events.

The computer-readable storage medium can further include instructions for computing, based on the event classification policy, a primitive value of each of the set of non-veto events as a function of a compliance factor of the corresponding event and the weight of the corresponding event, and instructions for computing a confidence measure of the second computer node as a function of the primitive values of the set of non-veto events and the set of veto events.

The instructions for computing the confidence measure can include instructions for computing a value of the confidence measure that ranges between a first threshold and a second threshold.

The confidence measure having the value equal to the first threshold can indicate that the takeover by the second computer node fails resulting in a loss of access to the storage system if the first computer node fails.

The confidence measure having the value equal to the second threshold can indicate that there is no adverse impact on computing resources of the distributed computing system if the second computer node takes over from the first computer node.

The instructions for computing the confidence measure of the second computer node can include instructions for determining that the set of veto events is not a null set, which indicates that a veto event related to the second computer node occurred in the distributed computing system, and computing the value of the confidence measure as equal to the first threshold. The veto event can include an event that causes the takeover by the second compute node to fail resulting in a loss of access to data stored at the storage system.

The computer-readable storage medium can further include instructions for determining that the value of the confidence measure is below a specified threshold, which is between the first threshold and the second threshold; and instructions for generating a notification indicating the value of the confidence measure, the notification including a list of tasks to be performed to increase the confidence measure above the specified threshold.

The computer-readable storage medium of claim 18, wherein the instructions for computing the weight of each of the set of non-veto events includes instructions for computing the weight of an event i as $W_i = SI_i / (\Sigma_{i=1}^{n} SI_i)$ where $W_i$ is the weight of the event i, $SI_i$ is a severity index of the event i and n is the number of events.

The instructions for computing the primitive value of each of the set of non-veto events can include instructions for computing the primitive value of an event i as $P_i = W_i * CF_i$ where $P_i$ is the primitive value of the event i and $CF_i$ is the compliance factor of the event i.

The instructions for computing the confidence measure can include instructions for computing the confidence measure as $CM=(\Sigma_{i=1}^{n} Pi)*Veto* 100\%$, where CM is confidence measure of the second computer node,
n is the number of events,
$P_i$ is the primitive value of an event i and $CF_i$ is the compliance factor of the event i,
Veto is "0" for a negative veto event that causes the distributing computing system to fail, or "1" for a positive veto event that has a positive impact on a working of the distributing computing system.

Some embodiments include a system that includes a processor and a first component that is configured to receive a list of multiple events that have occurred in a distributed computing system over a specified period. The events can be are related to a first computer node and a second computer node of the distributed computing system. The first computer node can be configured to respond to a data access request received in the distributed computing system from a client computer node and the second computer node can be configured to take over from the first computer node in case the first computer node becomes unavailable.

The system can further include a second component configured to determine, based on an event classification policy and from the events, a set of non-veto events and a set of veto events related to the second computer node. The system can include a third component configured to retrieve, based on the event classification policy, a severity index and a compliance factor for each event of the set of non-veto events, and a fourth component that is configured to compute a confidence measure of the second computer node as a function of the set of veto events and the severity index and the compliance factor of the set of non-veto events.

Figure 7:
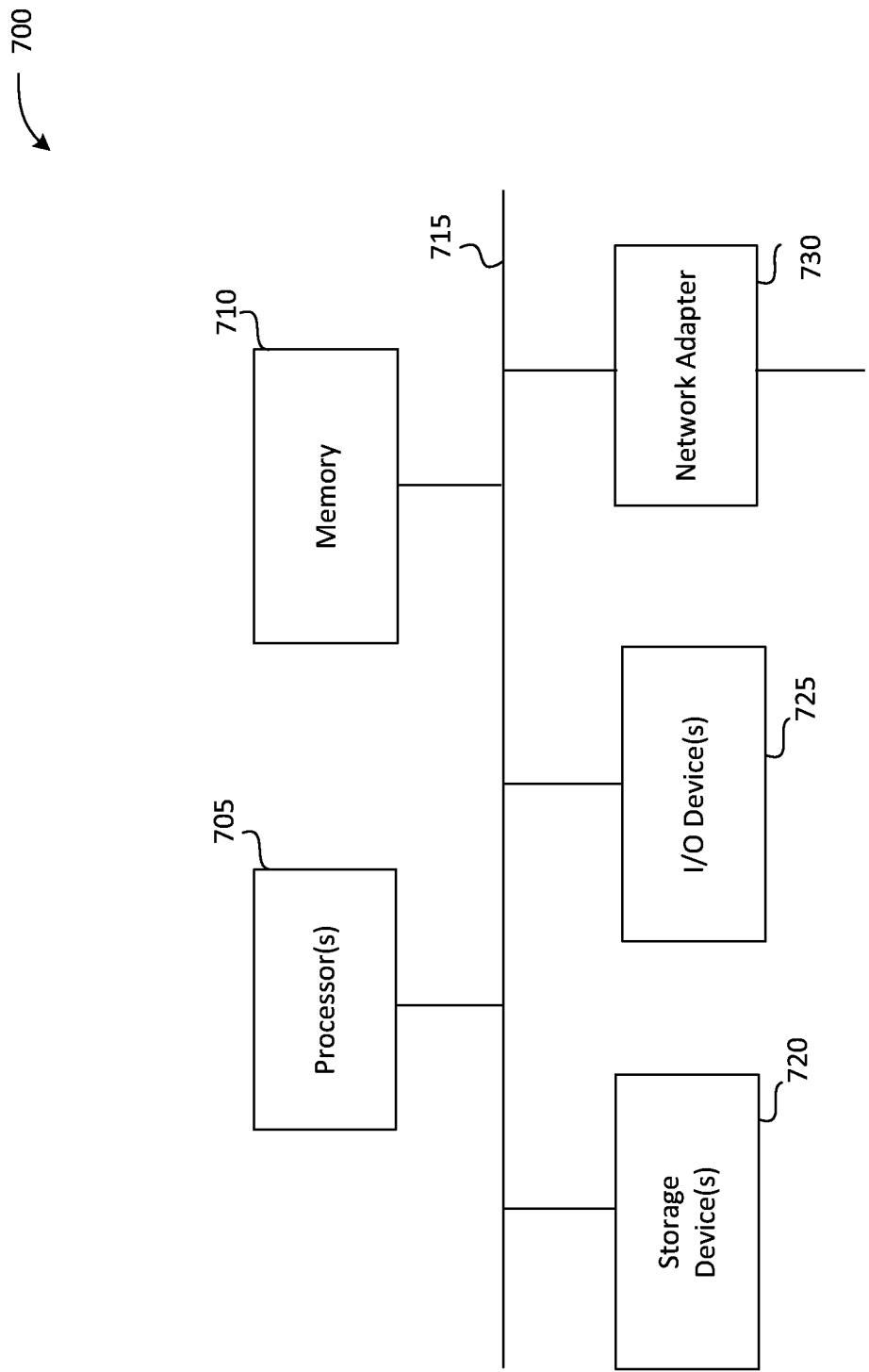
FIG. 7 is a block diagram of a computer system as may be used to implement features of some embodiments of the disclosed technology.

FIG. 7 is a block diagram of a computer system as may be used to implement features of some embodiments of the disclosed technology. The computing system 700 may be used to implement any of the entities, components or services depicted in the examples of FIGS. 1-6 (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 710 and storage devices 720 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the computing system 700 by downloading it from a remote system through the computing system 700 (e.g., via network adapter 730).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Some terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method, comprising:
   receiving a list of multiple events that have occurred in a distributed computing system over a specified period, the events related to a first computer node and a second computer node of the distributed computing system, the first computer node configured to manage a data access request received from a client computer node for data stored at a storage system associated with the first computer node, the second computer node configured to take over from the first computer node in case the first computer node becomes unavailable;
   determining, based on an event classification policy, a set of non-veto events and a set of veto events related to the second computer node from the events;
   retrieving, based on the event classification policy, a severity index and a compliance factor for each event of the set of non-veto events; and
   computing a confidence measure of the second computer node as a function of the set of veto events and the severity index and the compliance factor of the set of non-veto events.

2. The computer-implemented method of claim 1, wherein the confidence measure indicates at least one of whether the takeover by the second computer node fails, which results in a loss of access to the storage system or a magnitude of an impact on a performance of the distributed computing system if the second computer node takes over from the first computer node.

3. The computer-implemented method of claim 1, wherein the severity index of an event of the set of non-veto events indicates a magnitude of performance impact on the distributed computing system due to the occurrence of the event.

4. The computer-implemented method of claim 3, wherein the severity index of the event is recorded in real-time as the event occurs.

5. The computer-implemented method of claim 1, wherein the compliance factor an event of the set of non-veto events indicates a deviation of the event from an expected behavior of the event.

6. The computer-implemented method of claim 1, wherein the set of non-veto events are events that have an adverse impact on computing resources of the distributed computing system if the second computer node takes over from the first computer node, the set of non-veto events excluding events that cause the takeover to fail.

7. The computer-implemented method of claim 1, wherein the confidence measure having the value equal to a first threshold indicates that the takeover by the second computer node fails.

8. The computer-implemented method of claim 1, wherein the confidence measure having the value equal to a second threshold indicates that there is no adverse impact on computing resources of the distributed computing system if the second computer node takes over from the first computer node.

9. The computer-implemented method of claim 7 further comprising:
   determining that the value of the confidence measure is below a specified threshold, the specified threshold being between the first threshold and a second threshold; and
   generating a notification indicating the value of the confidence measure.

10. The computer-implemented method of claim 9, wherein generating the notification includes generating a list of tasks to be performed to increase the confidence measure above the specified threshold.

11. The computer-implemented method of claim 7, wherein computing the confidence measure of the second computer node includes:
    determining that the set of veto events is not a null set, which indicates that a veto event related to the second computer node occurred in the distributed computing system, the veto event causing the takeover by the second computer node to fail and result in loss of access to data stored at the storage system, and
    computing the value of the confidence measure as equal to the first threshold if the set of veto events is not a null set.

12. A computer-readable storage medium storing computer-executable instructions comprising:
    instructions for identifying, in a distributed computing system having a first computer node and a second computer node, among multiple events that have occurred over a specified period, a set of non-veto events and a set of veto events related to the second computer node, the first computer node configured to manage a data access request received from a client computer node for accessing data stored at a storage system associated with the first computer node, the second computer node configured to take over from the first computer node to respond to the data access request in case the first computer node becomes unavailable;
    instructions for computing, based on an event classification policy, a weight of each of the set of non-veto events as a function of a severity index of the corresponding event and the set of non-veto events;
    instructions for computing, based on the event classification policy, a primitive value of each of the set of non-veto events as a function of a compliance factor of the corresponding event and the weight of the corresponding event; and
    instructions for computing a confidence measure of the second computer node as a function of the primitive values of the set of non-veto events and the set of veto events.

13. The computer-readable storage medium of claim 12, wherein the confidence measure having the value equal to a first threshold indicates that the takeover by the second computer node fails resulting in a loss of access to the storage system if the first computer node fails.

14. The computer-readable storage medium of claim 12, wherein the confidence measure having the value equal to a second threshold indicates that there is no adverse impact on computing resources of the distributed computing system if the second computer node takes over from the first computer node.

15. The computer-readable storage medium of claim 13, wherein the instructions for computing the confidence measure of the second computer node includes:

instructions for determining that the set of veto events is not a null set, which indicates that a veto event related to the second computer node occurred in the distributed computing system, the veto event causing the takeover by the second compute node to fail resulting in a loss of access to data stored at the storage system, and computing the value of the confidence measure as equal to the first threshold.

16. The computer-readable storage medium of claim 12 further comprising:

instructions for determining that the value of the confidence measure is below a specified threshold, the specified threshold being between a first threshold and a second threshold; and instructions for generating a notification indicating the value of the confidence measure, the notification including a list of tasks to be performed to increase the confidence measure above the specified threshold.

17. The computer-readable storage medium of claim 12, wherein the instructions for computing the weight of each of the set of non-veto events includes instructions for computing the weight of an event i as $W_i = SI_i/(\Sigma_{i=1}^{n} SIi)$ where $W_i$ is the weight of the event i, $SI_i$ is a severity index of the event i and n is the number of events.

18. The computer-readable storage medium of claim 12, wherein the instructions for computing the primitive value of each of the set of non-veto events includes instructions for computing the primitive value of an event i as $P_i = W_i \cdot CF_i$ where $P_i$ is the primitive value of the event i and $CF_i$ is the compliance factor of the event i.

19. The computer-readable storage medium of claim 12, wherein the instructions for computing the confidence measure includes instructions for computing the confidence measure as $CM = (\Sigma_{i=1}^{n} Pi) * Veto * 100\%$, where CM is confidence measure of the second computer node, n is the number of events, $P_i$ is the primitive value of an event i and $CF_i$ is the compliance factor of the event i, Veto is "0" for a negative veto event that causes the distributing computing system to fail, or "1" for a positive veto event that has a positive impact on a working of the distributing computing system.

20. A system comprising:

a processor;

a first component configured to receive a list of multiple events that have occurred in a distributed computing system over a specified period, the events related to a first computer node and a second computer node of the distributed computing system, the first computer node configured to respond to a data access request received in the distributed computing system from a client computer node, the second computer node configured to take over from the first computer node in case the first computer node becomes unavailable;

a second component configured to determine, based on an event classification policy and from the events, a set of non-veto events and a set of veto events related to the second computer node;

a third component configured to retrieve, based on the event classification policy, a severity index and a compliance factor for each event of the set of non-veto events; and a fourth component configured to compute a confidence measure of the second computer node as a function of the set of veto events and the severity index and the compliance factor of the set of non-veto events.

* * * * *